(12) United States Patent
Gosalia et al.

(10) Patent No.: US 8,332,595 B2
(45) Date of Patent: Dec. 11, 2012

(54) TECHNIQUES FOR IMPROVING PARALLEL SCAN OPERATIONS

(75) Inventors: Ashit R. Gosalia, Bellevue, WA (US); Oleksandr Gololobov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 12/033,106

(22) Filed: Feb. 19, 2008

(65) Prior Publication Data

US 2009/0207521 A1    Aug. 20, 2009

(51) Int. Cl.
*G06F 12/00* (2006.01)
(52) U.S. Cl. ............. 711/154; 710/37; 710/48; 711/114
(58) Field of Classification Search .................. None
See application file for complete search history.

(56) References Cited

U.S. PATENT DOCUMENTS

| | | | |
|---|---|---|---|
| 5,355,478 A * | 10/1994 | Brady et al. ........................ 1/1 | |
| 5,784,697 A | 7/1998 | Funk et al. | |
| 6,041,384 A * | 3/2000 | Waddington et al. ......... 710/200 | |
| 6,148,361 A * | 11/2000 | Carpenter et al. ............ 710/260 | |
| 6,167,437 A | 12/2000 | Stevens et al. | |
| 6,289,369 B1 | 9/2001 | Sundaresan | |
| 6,785,888 B1 * | 8/2004 | McKenney et al. ........... 718/104 | |
| 6,993,762 B1 | 1/2006 | Pierre | |
| 7,159,216 B2 | 1/2007 | McDonald | |
| 7,565,651 B1 * | 7/2009 | Carey ............................. 718/100 | |
| 2003/0093647 A1 * | 5/2003 | Mogi et al. ......................... 712/1 | |
| 2006/0236069 A1 * | 10/2006 | Kalach et al. ................. 711/173 | |
| 2006/0259704 A1 | 11/2006 | Wyman | |
| 2007/0079298 A1 | 4/2007 | Tian et al. | |
| 2007/0214333 A1 | 9/2007 | Nijhawan et al. | |
| 2008/0147599 A1 * | 6/2008 | Young-Lai ......................... 707/2 | |

OTHER PUBLICATIONS

"Big way server still seeing I/O bottlenecks? Get acronym-aware: SQL Server soft-NUMA support may be for you", http://sqlserverpedia.com/blog/?p=200.
Marathe, et al., "Hardware Profile-guided Automatic Page Placement for ccNUMA Systems", Department of Computer Science, North Carolina State University, Raleigh. pp. 1-10.
Nikolopoulos, et al., "User-Level Dynamic Pages Migration for Multiprogrammed Shared-Memory Multiprocessors", IEEE, 2000., pp. 95-103.

\* cited by examiner

*Primary Examiner* — Brian Peugh
*Assistant Examiner* — Nicholas Simonetti

(57) ABSTRACT

Various technologies and techniques are disclosed for improving performance of parallel scans. Disk head randomization that occurs when performing a parallel scan is minimized by assigning a worker entity to each disk involved in the parallel scan, and by ensuring data is only accessed on a respective disk by the worker entity assigned to the disk. A parallel scan can be performed that is NUMA aware by ensuring a particular sub-set of data is resident in the same memory node during each parallel scan, and by ensuring the particular sub-set of data is processed by a worker entity assigned to a node in which the sub-set of data is resident. A process for performing a parallel scan involves breaking up work into sub-sets, assigning work to each worker entity that corresponds to a respective disk, and having the worker entities process the assigned work to complete the parallel scan.

16 Claims, 9 Drawing Sheets

TECHNIQUES FOR IMPROVING PARALLEL SCAN OPERATIONS

BACKGROUND

Over time, computer hardware has become faster and more powerful. For example, computers of today can have multiple processor cores that operate in parallel. Programmers would like for different pieces of the program to execute in parallel on these multiple processor cores to take advantage of the performance improvements that can be achieved. Thus, many software applications have been developed that process some of the data in parallel. For example, some database applications, such as MICROSOFT® SQL Server, support parallel scans against the data. In other words, data can be retrieved from a database in parallel by two or more threads at the same time. In such a scenario, one thread retrieves part of the data requested by a query or other read operation, while another thread retrieves another part of the data.

Bottlenecks can arise at the physical disk level when using parallel scanning techniques against data in data stores. One inefficiency with parallel scanning can involve disk head randomization. Since any thread can read data from any disk, disk heads are moved back and forth across sectors of the disks. This randomized access by any thread against any disk can cause inefficient access to the data because randomized access to data has greater overhead than sequential access. Another inefficiency that can arise when performing parallel scans is that scans for data do not take advantage of the fact that some portion of memory has a lower latency than other portions of memory. This is called non-NUMA awareness. Yet another inefficiency that can arise with parallel scans is when input/output interrupt processing is allowed to arise on any processing unit available in the system, which results in higher latency.

SUMMARY

Various technologies and techniques are disclosed for improving performance of parallel scans. Disk head randomization that occurs when performing a parallel scan is minimized by assigning a worker entity to each disk involved in the parallel scan, and by ensuring data is only accessed on a respective disk by the worker entity assigned to the disk. A parallel scan can be performed that is NUMA aware by ensuring a particular sub-set of data is resident in the same memory node during each parallel scan, and by ensuring the particular sub-set of data is processed by a worker entity assigned to a node in which the sub-set of data is resident.

In one implementation, a process for performing a parallel scan is described. Disks are identified where the data to be accessed during a parallel scan is located. A worker entity is assigned for each of the disks. Sub-sets of the data are identified, with each sub-set corresponding to information that spans a single one of the disks. Work is assigned to each of the worker entities based upon the sub-sets so that each of the worker entities is assigned a portion of the overall amount of work. The worker entities then process the assigned work to complete the parallel scan.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as an application that improves parallel scan operations, but the technologies and techniques also serve other purposes in addition to these. In one implementation, one or more of the techniques described herein can be implemented as features within a database program such as MICROSOFT® SQL Server, or from any other type of program or service that performs parallel scans against data in a data store.

In one implementation, one or more of the technologies and techniques described herein can be used to execute parallel scans of data in a way that can reduce or eliminate bottlenecks that occur at the physical disk level when performing the parallel scan.

Figure 1:
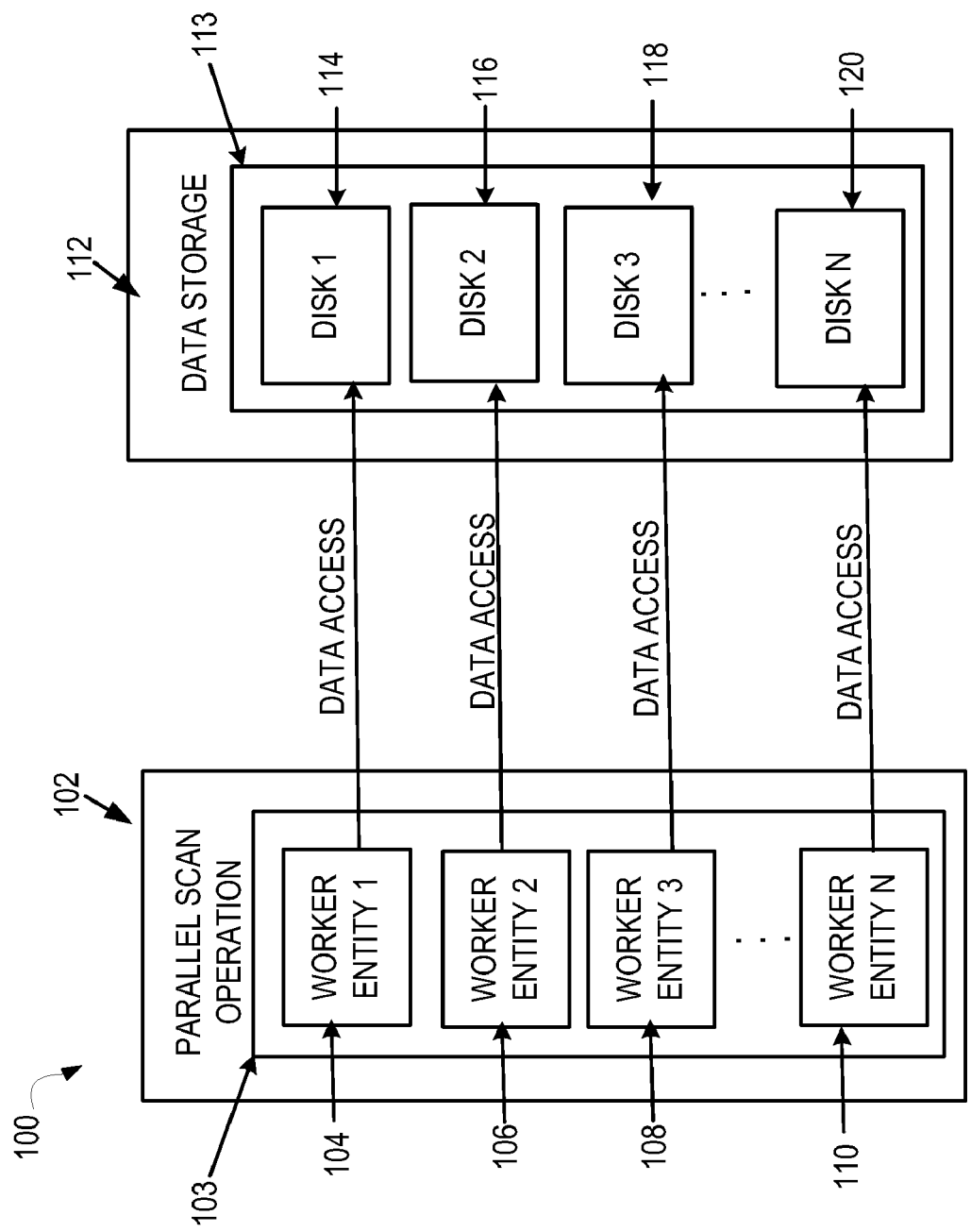
FIG. 1 is a diagrammatic view of an exemplary parallel scan operation.

FIG. 1 illustrates is a diagrammatic view 100 of an exemplary parallel scan operation 102 of one implementation. A parallel scan operation 102 is created with some number of multiple worker entities (104, 106, 108, and 110). The term "worker entity" as used herein is meant to include a logical entity in a parallel scan that has been assigned to do a portion of the overall work. Each worker entity is then assigned to a respective disk (114, 116, 118, and 120, respectively) that contains data involved in the parallel scan. In other words, the disks 113 on which the data that needs accessed are contained are assigned a worker entity. The term "disk" as used herein is meant to include one or more spindles that are viewed as one logical entity by the operating system. There may be other disks in the system that are not assigned worker entities 103 because those disks do not contain data that will be accessed during the parallel scan. Once each worker entity (104, 106, 108, and 110) is assigned to a respective disk (114, 116, 118, and 120), then each worker entity (104, 106, 108, or 110) is responsible for accessing data during the parallel scan only from the respective disk (114, 116, 118, or 120, respectively) to which it was assigned. In one implementation, data is accessed sequentially during the parallel scan by each worker entity. More detailed processes of how a parallel scan is performed in some implementations are described in further detail in FIGS. 3-8. In one implementation, by assigning respective worker entities 103 to respective disks 113, disk head randomization is minimized because a respective worker entity is just accessing a single disk.

Figure 2:
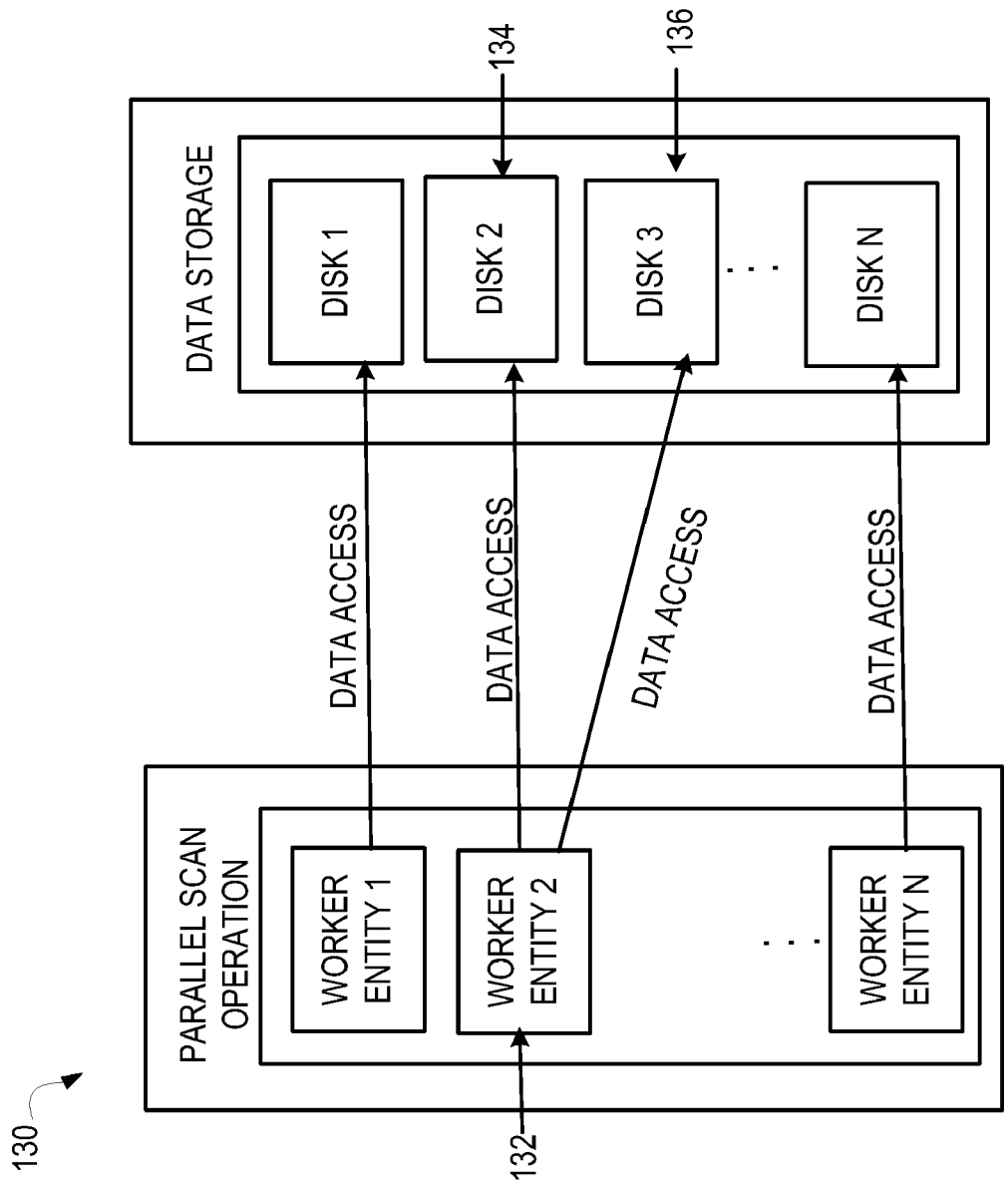
FIG. 2 is a diagrammatic view of an exemplary parallel scan operation.

FIG. 2 illustrates is a diagrammatic view 130 of an exemplary parallel scan operation of another implementation. In the example shown in FIG. 2, a single worker entity 132 is assigned to more than one disk (134 and 136). In other words, a single disk (such as 134) is accessed by only one worker entity (such as 132), but the same worker entity (such as 132) can access more than one disk (such as also 136).

Turning now to FIGS. 3-8, the stages for one or more implementations of a parallel scan operation are described in further detail. In some implementations, the processes of FIG. 3-8 are at least partially implemented in the operating logic of computing device 400 (of FIG. 9).

Figure 3:
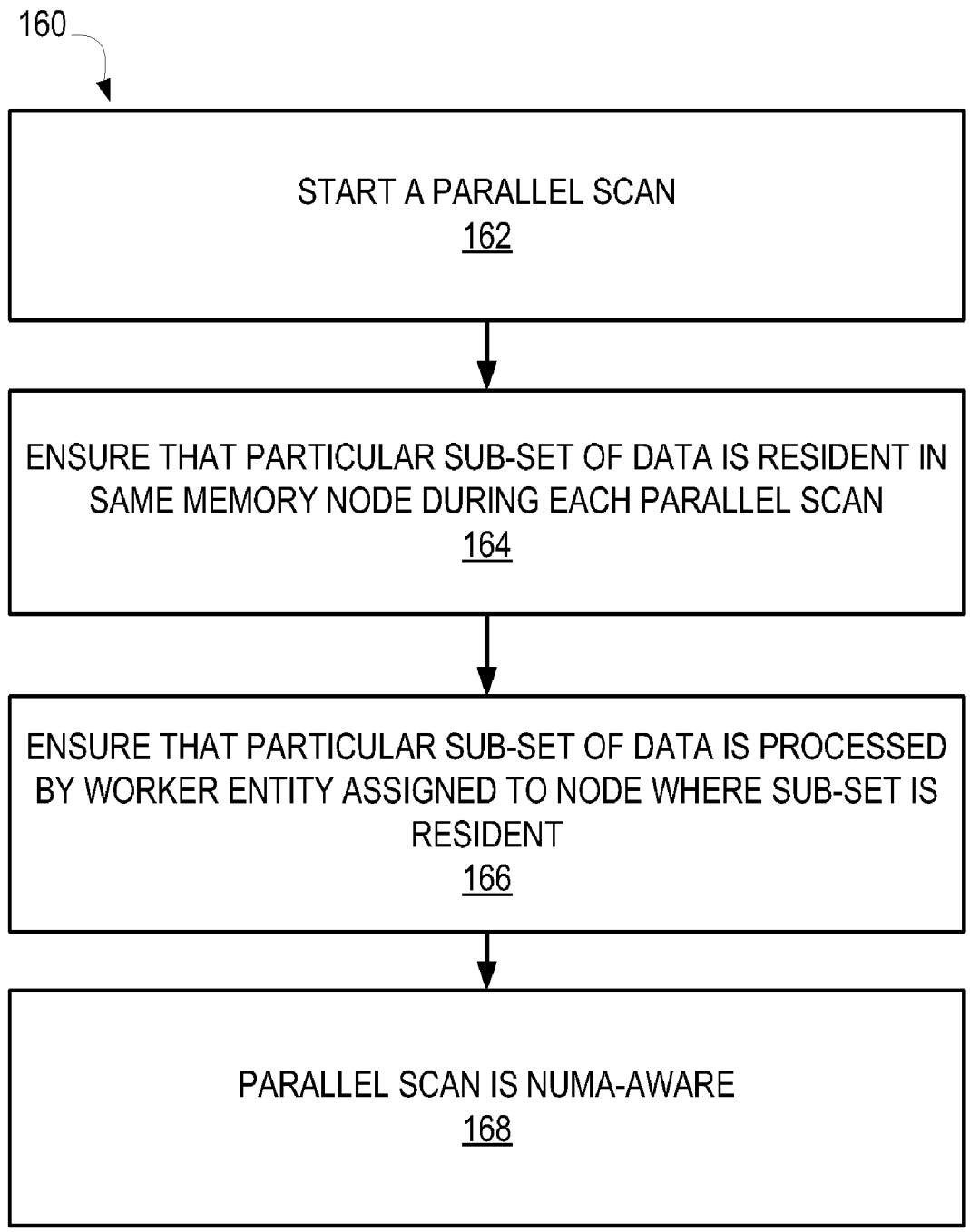
FIG. 3 is a process flow diagram for one implementation illustrating the stages involved in performing a parallel scan that is NUMA aware.

FIG. 3 is a process flow diagram 160 that illustrates one implementation of the high level stages involved in performing a parallel scan that is NUMA aware. NUMA stands for "non-uniform memory access". On a computer with NUMA hardware, the software that runs on a processing unit might have different performance depending on whether the software accesses data residing in memory on the local NUMA node or on remote NUMA node(s) because memory access latency is greater in the latter case. The nodes of a processing unit might have processing unit controllers with multiple memory controllers. In other words, this means that it is faster to access data through a local NUMA node than a separate memory controller. In one implementation, techniques are described for performing a parallel scan that is NUMA aware.

To do so, a parallel scan is started (stage 162). The system then ensures that a particular sub-set of data is resident in the same memory node during each later parallel scan (stage 164). The term "memory node" as used herein is meant to include a portion of memory address space that is closer to a set of processing units than others. In this scenario, closer means having a lower access latency. In one implementation, to ensure that the particular sub-set is resident in the same memory node, the sub-set is read into the same memory node each time a read of the particular piece of data is performed. The system also ensures that the particular sub-set of data is processed by a worker entity that was assigned to the node where the sub-set of data is resident (stage 166). As a result of these actions, the parallel scan is NUMA aware (stage 168).

Figure 4:
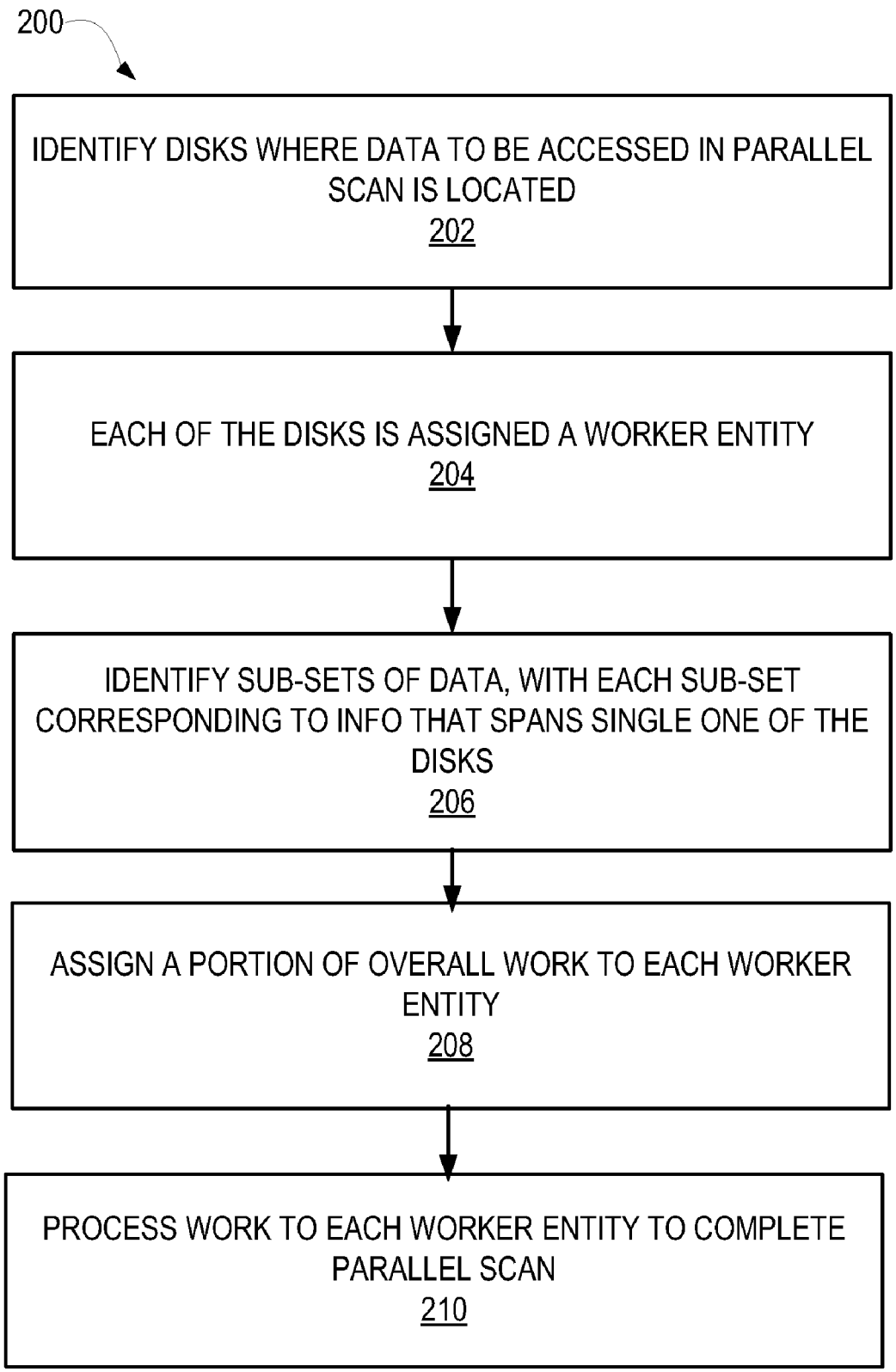
FIG. 4 is a process flow diagram for one implementation illustrating the more detailed stages involved in performing a parallel scan against a data store.

Turning now to FIGS. 4-8, more detailed implementations of performing a parallel scan are described in further detail. These techniques can be used with parallel scans that are NUMA aware and/or with parallel scans that are not NUMA aware, such as on a distributed system where an independent computer is used instead of NUMA nodes, and/or with other types of systems. FIG. 4 is a process flow diagram 200 that illustrates one implementation of the stages involved in performing a parallel scan against a data store. The data to be accessed during the parallel scan can be stored in one or more database(s), database table(s), and/or any other type of file(s) or data store(s) that is/are capable of storing data. The disks where the data is located that will be accessed during the parallel scan are identified (stage 202). In one implementation, the only disks that are included in the parallel scan include disks that do not have a spindle that is shared by more than one logical disk.

Each disk is assigned a worker entity (stage 204). In other words, no disk that contains data of interest during the scan is assigned more than one worker entity. Each of such disks has exactly one worker entity assigned. This assignment can be done up front before the parallel scan begins, can be assigned dynamically during the parallel scan, or at another suitable time. Sub-sets of the data are identified, with each sub-set corresponding to information that spans a single one of the disks (stage 206). This identifying of sub-sets can be done up front before the parallel scan begins, can be assigned dynamically during the parallel scan, or at another suitable time. A portion of overall work is assigned to each worker entity based upon the identified sub-sets (stage 208). In other words, each worker entity is assigned some portion of the overall work. In one implementation described in further detail in FIG. 5, queues are assigned to each worker entity to facilitate the processing of work for each worker entity. In other implementations, routines and/or data structures can be used to track what work has been assigned to each worker entity. Each worker entity then processes its respective assigned work to complete the parallel scan (stage 210).

Figure 5:
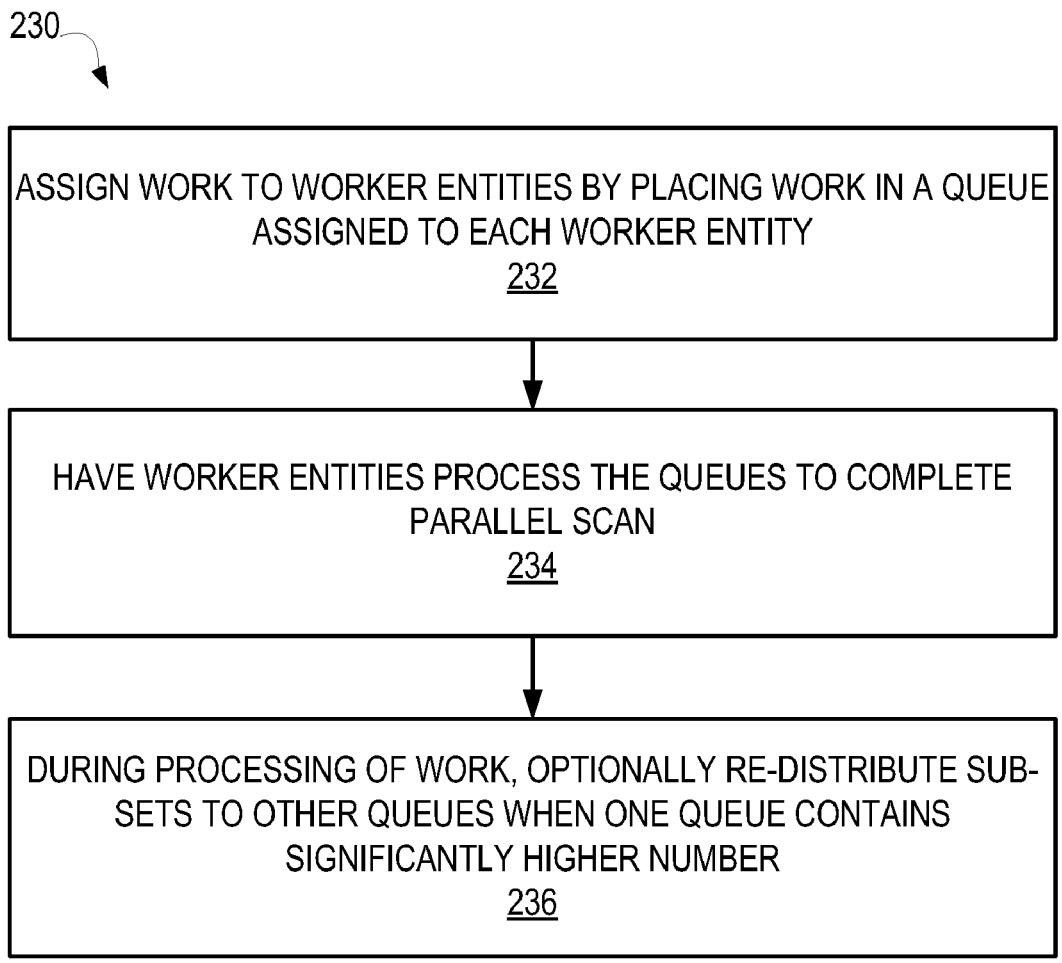
FIG. 5 is a process flow diagram for one implementation illustrating the stages involved in using queues to manage work assigned to worker entities involved in a parallel scan.

FIG. 5 is a process flow diagram 230 that illustrates one implementation of the stages involved in using queues to manage work assigned to worker entities involved in a parallel scan. Work is assigned to worker entities by placing work for each worker entity into a respective queue assigned to each worker entity (stage 232). This work contains sub-sets of the overall amount of work to be performed during the parallel scan by each respective worker entity. Each worker entity then processes its respective queue in parallel with the other worker entities to complete its share of the parallel scan (stage 234). During the processing of the work, sub-sets of work can optionally be re-distributed to other queues when one queue contains a significantly higher number of sub-sets to be processed (stage 236). In other words, load balancing can be performed to re-distribute the sub-sets of work among the worker entities when one entity has more than its share of the work or when one worker entity is falling behind the others in performance. This re-distributing can be performed based upon a passing of an amount of time, based upon dynamically based upon current processing speed, or upon numerous other criteria for determining that one or more worker entities have more than their share of the work. Another implementation of re-distribution of work is described in FIG. 6.

Figure 6:
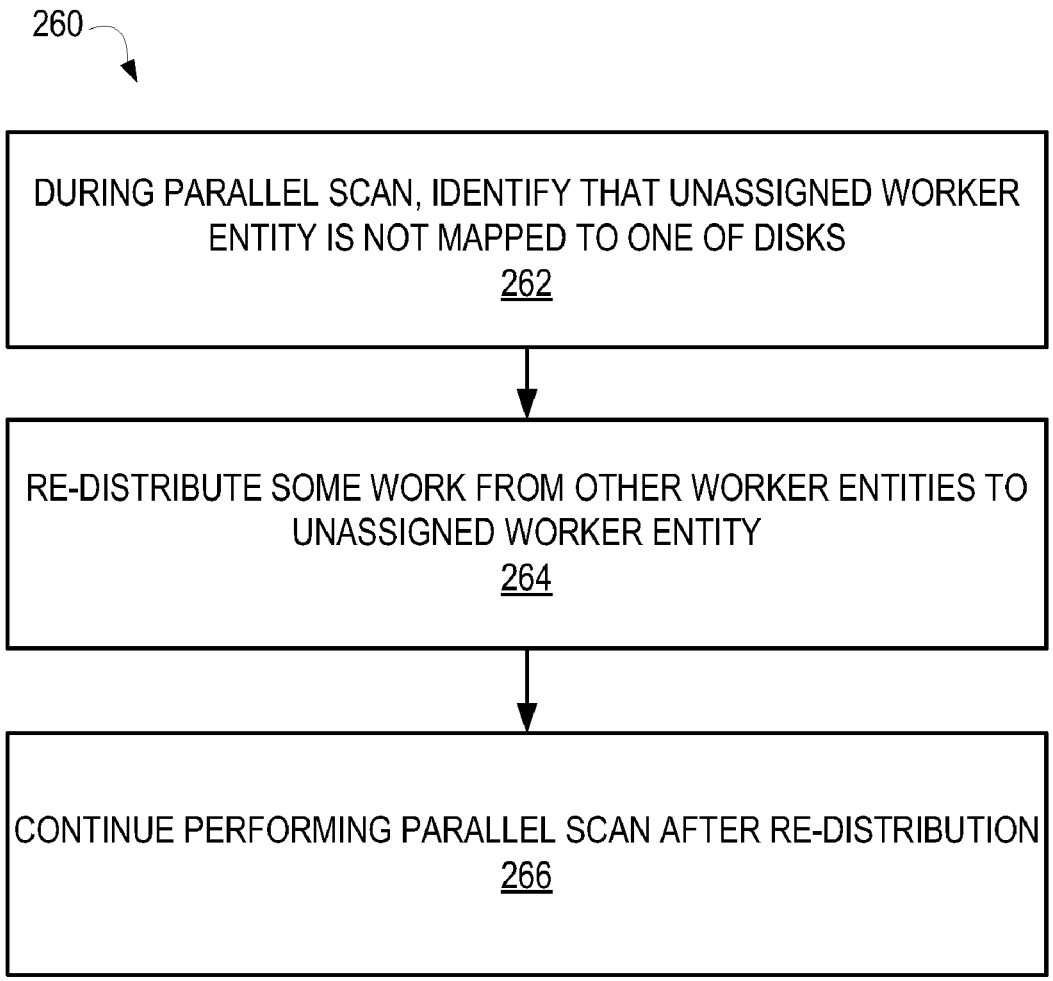
FIG. 6 is a process flow diagram for one implementation illustrating the stages involved in re-distributing work during a parallel scan to an unassigned worker entity.

FIG. 6 is a process flow diagram 260 that illustrates one implementation of the stages involved in re-distributing work during a parallel scan to an unassigned worker entity. During a parallel scan, if an unassigned worker entity is identified that is not mapped to one of disks (stage 262), then some sub-sets of work from other worker entities can be re-distributed to the unassigned worker entity (stage 264). In other words, if there is a worker entity available but that was not assigned a respective disk to process data for, then that idle worker entity can be put to use. The parallel scan continues after the re-distribution of the work (stage 266).

Figure 7:
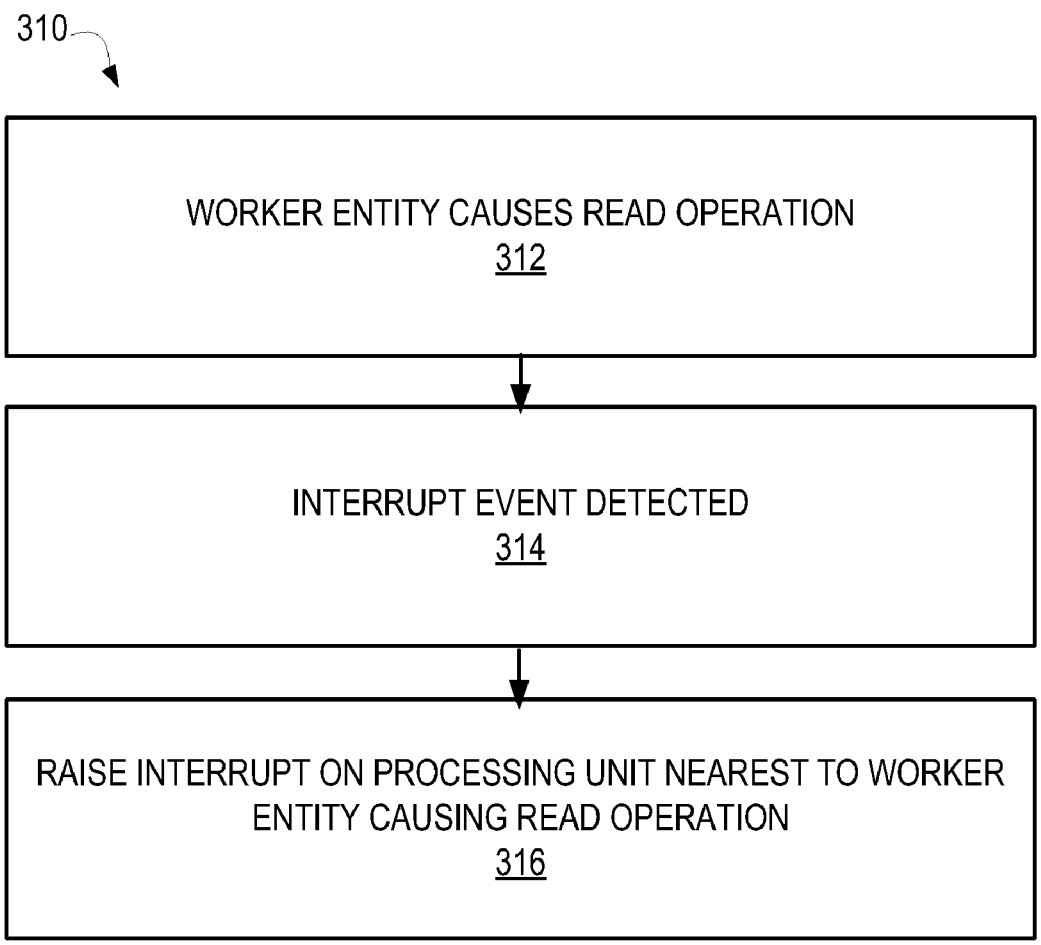
FIG. 7 is a process flow diagram for one implementation illustrating the stages involved in ensuring that interrupts only arise on a processing unit nearest to the worker entity causing the read operation during a parallel scan.

FIG. 7 is a process flow diagram 310 that illustrates one implementation of the stages involved in ensuring that interrupts only arise on a processing unit nearest to the worker entity causing the read operation during a parallel scan. A worker entity causes a read operation to be performed (stage 312). At some point, an interrupt event may be detected (stage 314). The interrupt is only allowed to be raised on the processing unit nearest to the worker entity causing the read operation (stage 316).

Figure 8:
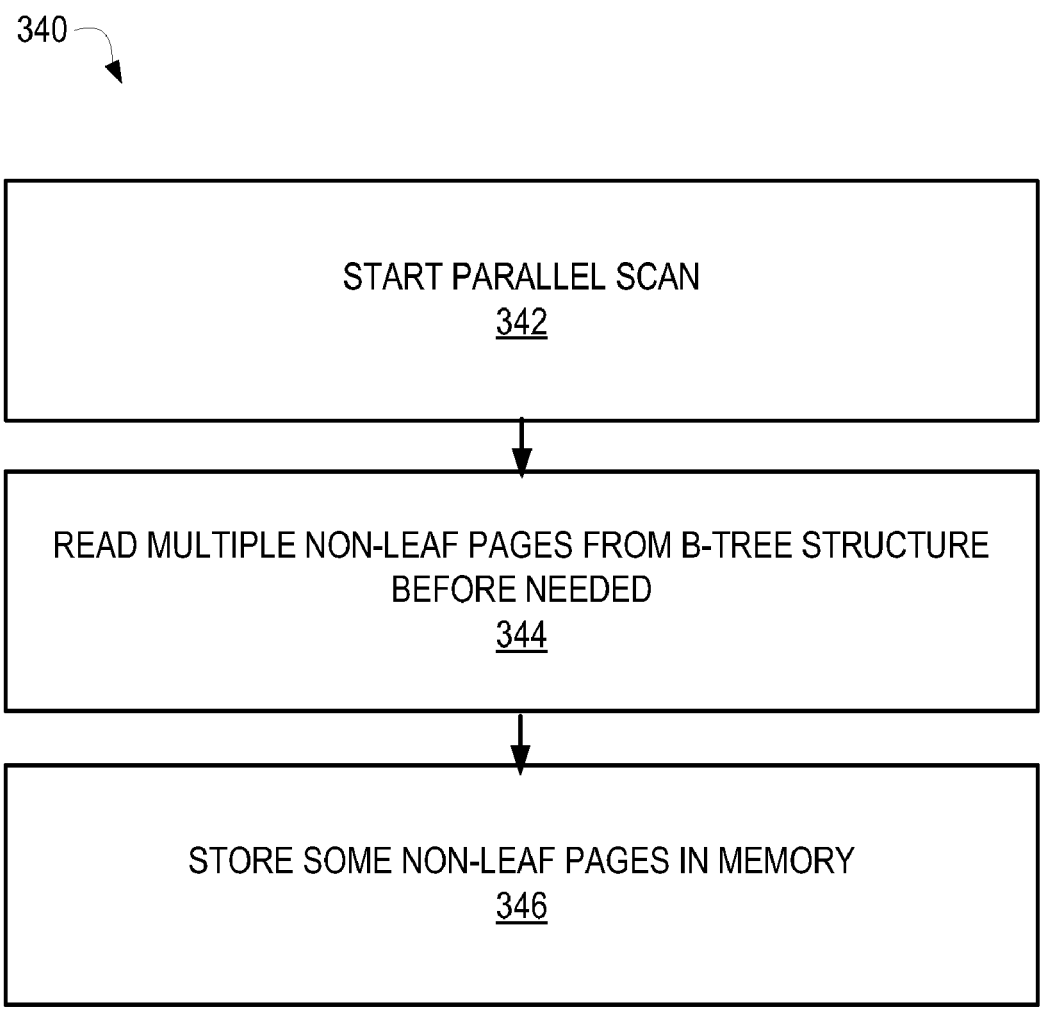
FIG. 8 is a process flow diagram for one implementation that illustrates the stages involved in reducing stalls and randomization of disk heads during a parallel scan by reading non-leaf pages early and storing them.

FIG. 8 is a process flow diagram 340 that illustrates one implementation of the stages involved in reducing stalls and randomization of disk heads during a parallel scan by reading non-leaf pages early and storing them. In the example described in this figure, reads are being performed against a B-tree structure. As background, a B-Tree is often used for storing table indexes or other information and maintains an ordered set of data that allows for a given value to be quickly retrieved, deleted, and/or inserted. A B-Tree contains pages that point to other pages. To search the B-Tree to retrieve a value, the tree is traversed from level to level until the desired value is located, or because there are no more paths in the tree to search. A leaf page is an index page that contains actual data, whereas a non-leaf page is a page that points to other index pages. Non-leaf pages are used primarily for navigation of the tree. A B-Tree structure is generally a much more efficient way of locating data than to search in sequential order to locate the desired value, especially when a large volume of data is present.

Returning now to the process described in FIG. 8, a parallel scan is started (stage 342). Multiple non-leaf pages are read from a B-tree structure before those pages are actually needed during the parallel scan (stage 344). Some number of those non-leaf pages can also be stored in memory for a period of time so they are already resident when they are needed (stage 346). In one implementation, by reading non-leaf pages ahead of time and/or storing at least part of them in memory, stalls and/or randomization of disk heads can be reduced.

Figure 9:
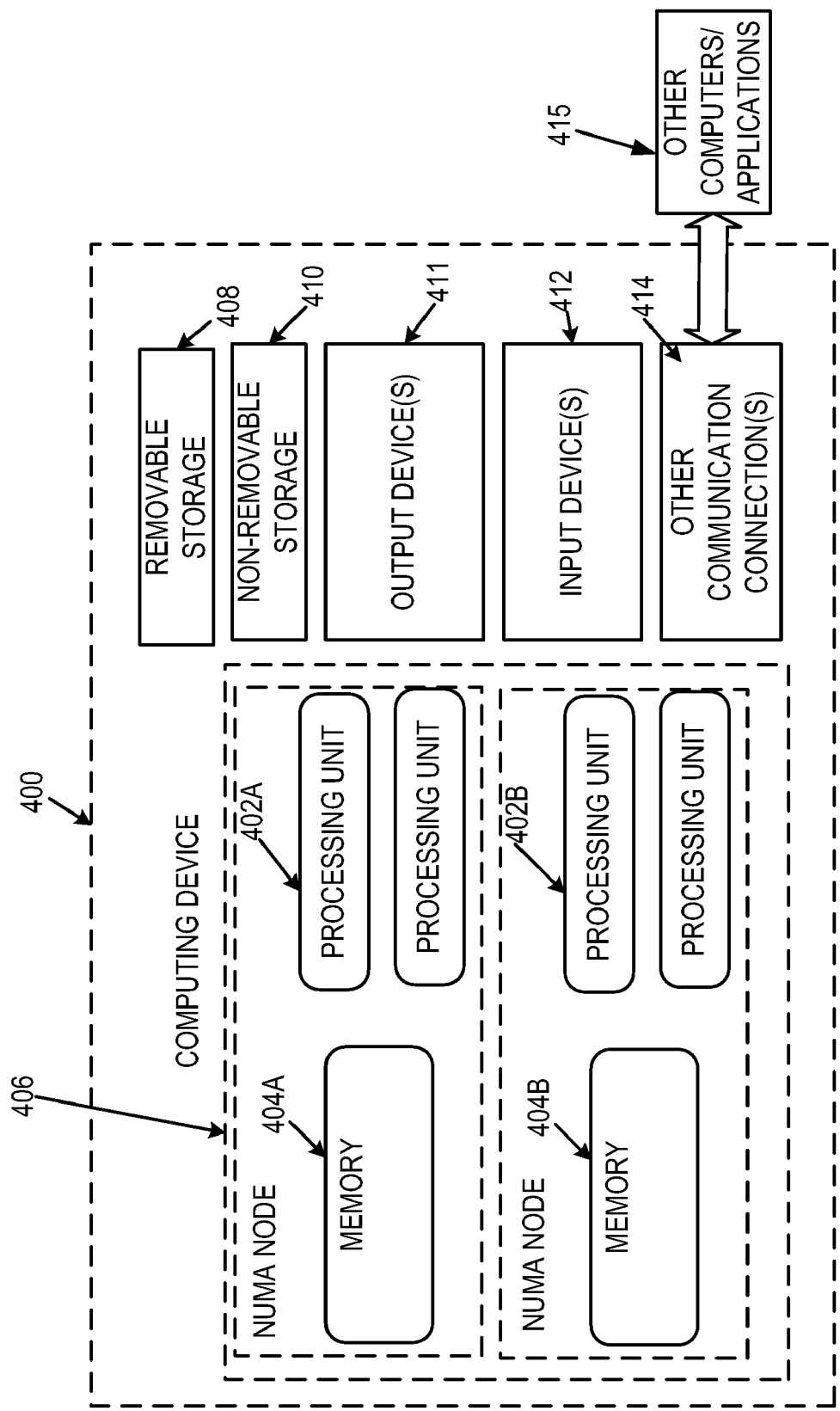
FIG. 9 is a diagrammatic view of a computer system of one implementation.

As shown in FIG. 9, an exemplary computer system to use for implementing one or more parts of the system includes a computing device, such as computing device 400. In its most basic configuration, computing device 400 typically includes at least multiple processing units (402A and 402B) and memory banks (404A and 404B). Depending on the exact configuration and type of computing device, memory banks (404A and 404B) may be volatile (such as RAM), non-volatile (such as ROM, flash memory, etc.) or some combination of the two. This most basic configuration is illustrated in FIG. 9 by dashed line 406.

Additionally, device 400 may also have additional features/functionality. For example, device 400 may also include additional storage (removable and/or non-removable) including, but not limited to, magnetic or optical disks or tape. Such additional storage is illustrated in FIG. 9 by removable storage 408 and non-removable storage 410. Computer storage media includes volatile and nonvolatile, removable and non-removable media implemented in any method or technology for storage of information such as computer readable instructions, data structures, program modules or other data. Memory banks (404A and 404B), removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Computing device 400 includes one or more communication connections 414 that allow computing device 400 to communicate with other computers/applications 415. Device 400 may also have input device(s) 412 such as keyboard, mouse, pen, voice input device, touch input device, etc. Output device(s) 411 such as a display, speakers, printer, etc. may also be included.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A computer-readable medium having computer-executable instructions for causing a computer to perform steps comprising:
    minimizing disk head randomization that occurs when performing a parallel scan by assigning a worker entity to each of a plurality of disks involved in the parallel scan, and ensuring that data is only accessed on a respective disk of the plurality of disks by the worker entity assigned to the respective disk, wherein the data is accessed sequentially during the parallel scan by each worker entity;
    reading a plurality of non-leaf pages from a b-tree structure before the plurality of non-leaf pages are needed during the parallel scan; and
    ensuring that interrupts only arise on a processing unit nearest to a respective worker entity that is causing a read operation to be performed.

2. The computer-readable medium of claim 1, further having computer-executable instructions for causing a computer to perform steps comprising:
    storing at least a portion of the non-leaf pages in memory for a period of time.

3. The computer-readable medium of claim 1, wherein the parallel scan is performed against a table in a database.

4. A method for performing a parallel scan against data comprising the steps of:
    identifying a plurality of disks where the data to be accessed during a parallel scan is located;
    assigning each of the disks a worker entity;
    identifying sub-sets of the data, with each sub-set corresponding to information that spans a single one of the plurality of disks;
    assigning work to each worker entity based upon the identified sub-sets so that each of worker entity is assigned a portion of an overall amount of work to be performed, at least one worker entity assigned to access more than one disk;
    processing the work assigned to each worker entity to complete the parallel scan, wherein each sub-set of the data is accessed sequentially during the parallel scan by the assigned worker entity;
    reading a plurality of non-leaf pages from a b-tree structure before the plurality of non-leaf pages are needed during the parallel scan; and
    ensuring that interrupts only arise on a processing unit nearest to a respective worker entity that is causing a read operation to be performed.

5. The method of claim 4, wherein the data to be accessed is contained in a database table.

6. The method of claim 4, wherein the only disks that are included in the parallel scan include disks that do not have a spindle that is shared by more than one logical disk.

7. The method of claim 4, wherein the work is assigned to each worker entity by placing work into a respective queue that is assigned to each worker entity.

8. The method of claim 7, wherein when a respective one of the queues is determined to contain a significantly higher number of the sub-sets to process than a remaining set of the queues, re-distributing at least some of the sub-sets from the respective one of the queues to the remaining set of the queues.

9. The method of claim 8, wherein the re-distributing is performed based upon a passing of an amount of time.

10. The method of claim 4, further comprising the step of: when an unassigned worker entity is not mapped to one of the disks, then re-distributing some of the work from other worker entities to the unassigned worker entity.

11. The method of claim 4, wherein the assigning work step is performed up front before the parallel scan begins.

12. The method of claim 4, wherein the assigning work step is performed dynamically during the parallel scan.

13. The method of claim 4, wherein the identifying sub-sets step is performed up front before the parallel scan begins.

14. The method of claim 4, wherein the identifying sub-sets step is performed dynamically during the parallel scan.

15. A method for improving performance of parallel scans against a disk comprising the steps of:

performing a parallel scan that is NUMA aware by ensuring that a particular sub-set of data is resident in a same memory node during each parallel scan, and ensuring that the particular sub-set of data is processed by a worker entity assigned to a node in which the sub-set of data is resident, wherein data is accessed sequentially during the parallel scan by the worker entity and a plurality of non-leaf pages are read from a b-tree structure before the plurality of non-leaf pages are needed during the parallel scan.

16. The method of claim 15, wherein the step of ensuring that the particular sub-set of data is resident in the same memory node is performed by reading the sub-set of data into the same memory node each time a read of the particular sub-set of data is performed.

* * * * *